United States Patent [19]

MacDonnell

[11] 3,854,782
[45] Dec. 17, 1974

[54] RESILIENT JOURNAL BOX STOP BLOCK
[75] Inventor: Robert W. MacDonnell, Crete, Ill.
[73] Assignee: Unity Railway Supply Co., Inc., Chicago, Ill.
[22] Filed: Dec. 18, 1972
[21] Appl. No.: 316,279

[52] U.S. Cl................. 308/38, 295/36 A, 308/180
[51] Int. Cl.... B60b 35/16, F16c 13/02, F16c 35/00
[58] Field of Search..... 105/218 R; 295/36 R, 36 A; 308/38, 39, 40, 41, 42, 79, 180

[56] References Cited
UNITED STATES PATENTS
3,061,385  10/1962  Horger et al...................... 308/180
3,272,573  9/1966  Smith et al........................... 308/38
3,720,175  3/1973  Russell-French.............. 295/36 R X Primary Examiner—M. Henson Wood, Jr.
Assistant Examiner—Howard Beltran
Attorney, Agent, or Firm—Hume, Clement, Brinks, William, Olds & Cook, Ltd.

[57] ABSTRACT

A polyurethane stop block is secured in an integral journal box that has been modified for roller bearing units. A spring steel clip anchors the block against the effects of vibration. The material block absorbs and cushions impact energy to protect the cage against damage.

3 Claims, 5 Drawing Figures 3,854,782
FIG. 2
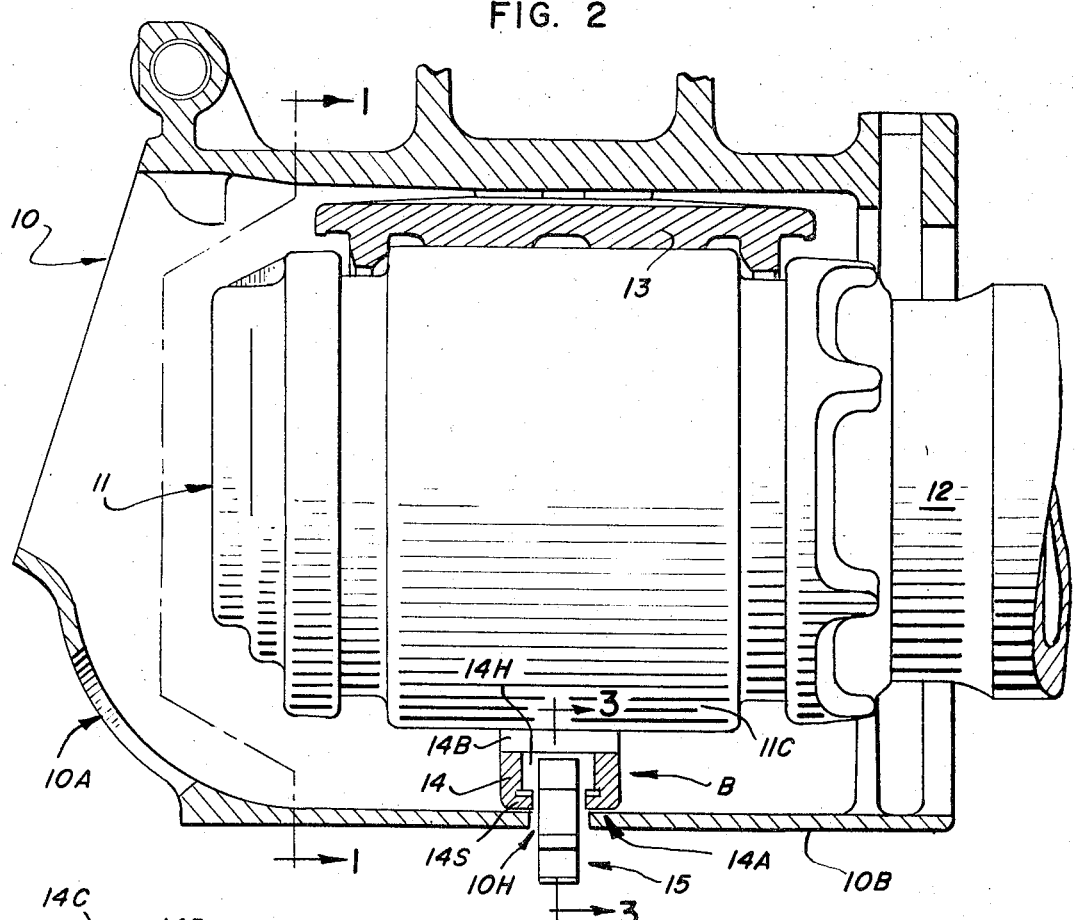
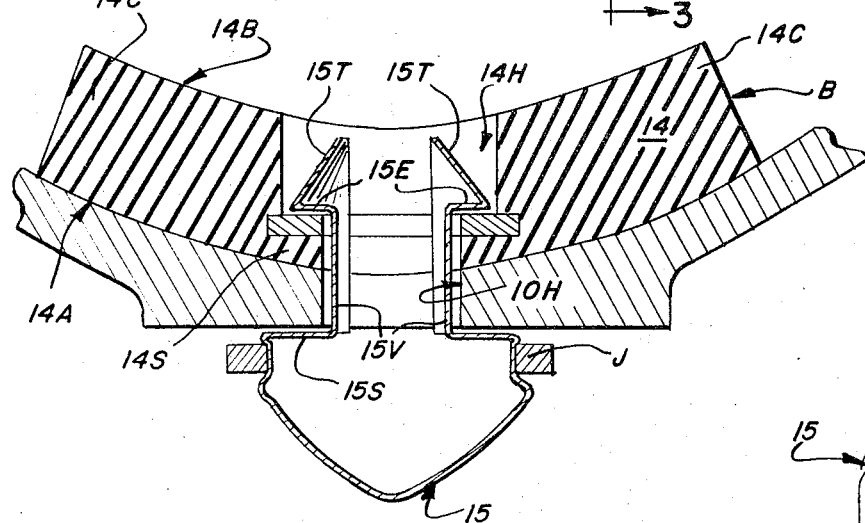
FIG. 3
FIG. 5
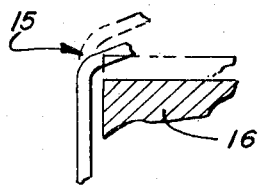

3,854,782

RESILIENT JOURNAL BOX STOP BLOCK

BACKGROUND OF THE INVENTION

Over the years, many of the railway car trucks that were originally of the solid journal bearing type have been modified to adapt the conventional integral journal box to accommodate conventional roller bearing units. In connection with these modified journal boxes, it has been the practice to utilize a curved stop block anchored to the bottom wall of the integral journal box by various types of bolt assemblies, the stop block being provided to limit the movement of the box relative to the cage of the roller bearing unit. To facilitate mounting of the stop block the upwardly curving outboard region of the bottom wall of the journal box is provided with an access hole through which the curved block may be inserted horizontally into position beneath the cage of the roller bearing assembly.

Slow motion films show that, under impact conditions, the journal box first moves up and then moves laterally relative to the roller bearing unit. This lateral movement results in damaging contact between the cage and the side wall structure of the journal box. The stop block is located to present a limited clearance distance with respect to the cage for limiting the vertical movement of the journal box, thereby to prevent subsequent lateral movement.

It has been the practice to use steel stop blocks and while such blocks are curved to closely complement the external contour of the cage region which they underlie, the impact of the hard steel stop blocks against the cage can cause sufficient damage to the cage to impair the anti-friction characteristics of the roller bearing unit, even in those instances where the stop block has succeeded in preventing lateral contact of the cage with the journal box.

In addition, the bolt type anchoring arrangement for the steel stop block is subjected to such severe vibration under normal usage that the anchorage loosens even where special lockwashers and locknuts are utilized. In these conditions the anchorage will allow rotation of the block about the bolt axis to a skewed relationship wherein the impact of the block against the cage produces additional damage. In many instances a bolt will work completely free and allow the block and the bolt to shift about within the journal box. These deficiencies have frustrated the original purpose of modifying the journal box to receive roller bearing units in that the damaged cages frequently lead to the development of hot boxes because of the impairment of the anti-friction characteristics of the roller bearing unit.

IMPROVEMENT OF THIS INVENTION

The present invention provides an improved stop block structure which exhibits sufficient resiliency to cushion impact of the block against the cage thereby minimizing potential damage to the cage sufficiently to avoid impairment of the anti-friction characteristics of the roller bearing unit. An improved molded stop block of a hardened elastomeric material is shaped to present upper corner portions that undergo limited resilient deformation upon contact with the cage to absorb and better distribute the shock forces associated with the usual impact conditions. The improved block has a downwardly-stepped vertical hole for registry with the existing hole in the bottom wall of the journal box, the stepped hole presenting an elastomeric lower step portion which is to be compressed in stationary position against the bottom wall of the box.

The molded elastomeric block incorporates a metal washer overlying the stepped portion for distributing the compression forces to be applied thereto by the anchoring facilities.

The invention provides a U-shaped spring steel clip arranged for insertion from beneath the journal box and providing immunity from the effects of vibration. The clip has complementary leg portions defining a stepped-configuration for cooperation with the vertical hole.

Other features and advantages of the invention will be apparent from the following description and claims and are illustrated in the accompanying drawings which show structure embodying preferred features of the present invention and the principles thereof, and what is now considered to be the best mode in which to apply these principles.

DESCRIPTION OF THE DRAWINGS

In the accompanying drawings forming a part of the specification, and in which like numerals are employed to represent like parts throughout the same:

FIG. 2 is a vertical lengthwise section through the box of FIG. 1;

FIG. 3 is an enlarged fragmentary section through the stop block as indicated at 3—3 on FIG. 2;

FIG. 5 is a detailed view of one of the clip legs illustrating accommodation of the clip to thickness tolerances of the bottom wall.

DESCRIPTION OF PREFERRED EMBODIMENT

Figure 1:
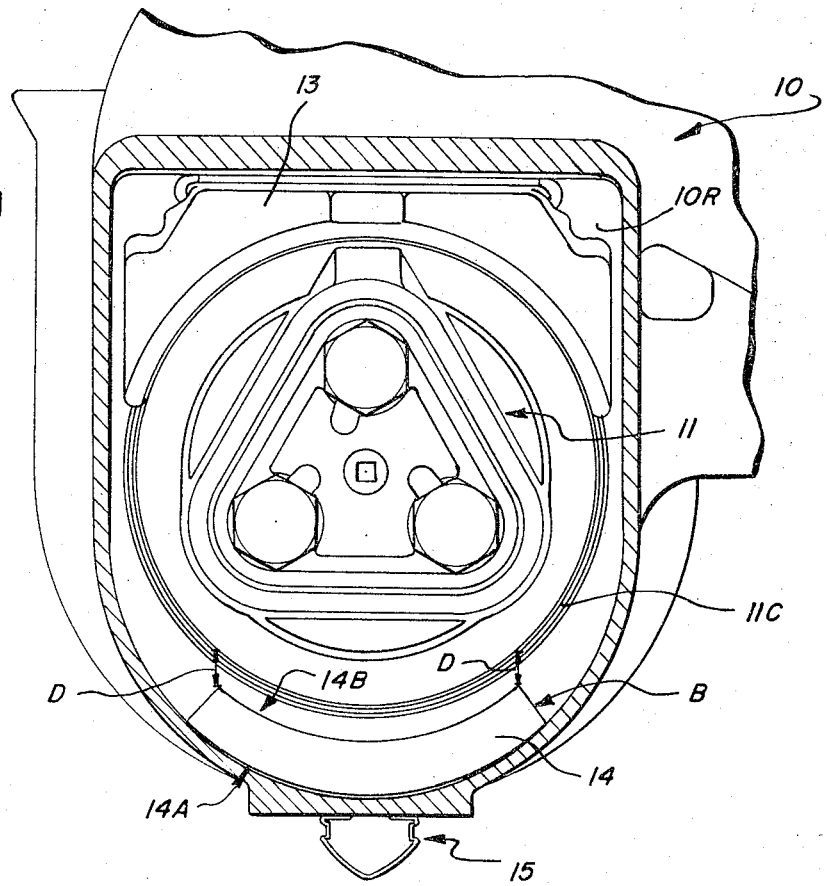
FIG. 1 is a vertical transverse section through an integral journal box modified to receive a roller bearing unit and showing the improved stop block arrangement of this invention.

Referring now to the drawings, the modified integral journal box of the type originally designed for solid journal bearing arrangements is designated generally at 10 and is shown equipped with a conventional roller bearing unit 11 that receives the axle journal 12. An adaptor 13 is shown mounted between the top of the roller bearing unit 11 and the roof of the journal box 10.

The journal box 10 has a concave bottom wall 10B which is provided with a central hole 10H and which includes an upwardly curving outboard portion provided with an access hole 10A through which an assembly tool (not shown) may be inserted. As is apparent in the drawing, the conventional integral journal box has a modified rib structure 10R which has been cut away to accept the roller bearing unit 11.

The improved stop block arrangement of this invention is designated generally at B and is shown to include a cushioning type block element 14 insertable laterally to the illustrated position of registry with the hole 10H and anchoring means 15 insertable through the hole 10H to engage the block 14 and hold it in stationary position within the journal box.

The block element 14 is a molded structure of a solid elastomeric material capable of providing high strength and high energy dissipation characteristics. In the preferred arrangement the block is of a polyurethane material of substantial hardness, preferably about 95

Shore A durometer or more. The block 14 has a generally arcuate configuration in lengthwise profile generally comparable to that of the steel blocks employed in the past so that the block is mounted in the box by insertion laterally into the space existing beneath the external cage 11C of the roller bearing unit and the bottom wall of the journal box. A conventional assembly tool may be employed with the block of the invention to hold it in proper location while the anchoring means 15 is applied.

The underface 14A of the block has a radius as curvature slightly greater than that of the concave inner surface of the bottom wall of the journal box and anchoring means 15 exerts sufficient downward force upon the block to distort it into a matching configuration wherein the block establishes full surface contact with the bottom surface of the journal box. The upper face 14B of the block has a radius of curvature slightly smaller than the curvature of the external surface of the cage 11C of the roller bearing unit so that the clearance distance between the cage and the block is a minimum at the corner portions 14C of the block as indicated by the dimensions arrows D in FIG. 1. In the case of a class D box, for a 5½" by 10" journal, this minimum clearance distance is typically 5/32 of an inch.

As best seen in FIG. 3 the stop block 14 has a downwardly stepped vertical hole 14H located centrally thereof for registry with the hole 10H in the bottom wall of the journal box to define the proper mounting position for the block. The upper region of the stepped hole 14H is of larger diameter than the lower region to define a lower step portion 14S of elastomeric material which is to be loaded in compression in stationary position against the bottom wall 10B of the journal box by means of the anchoring device 15. The vertical hole 14H of the block is shown incorporating a metal washer 16 which is molded in situ during the formation of the block and has its outer margin embedded in the material of the block. The metal washer 16 seats on the annular upper shoulder of the step portion 14S and is engaged by the anchoring means 15 for transmitting the anchoring force in distributed relation to the step portion of the block.

Figure 4:
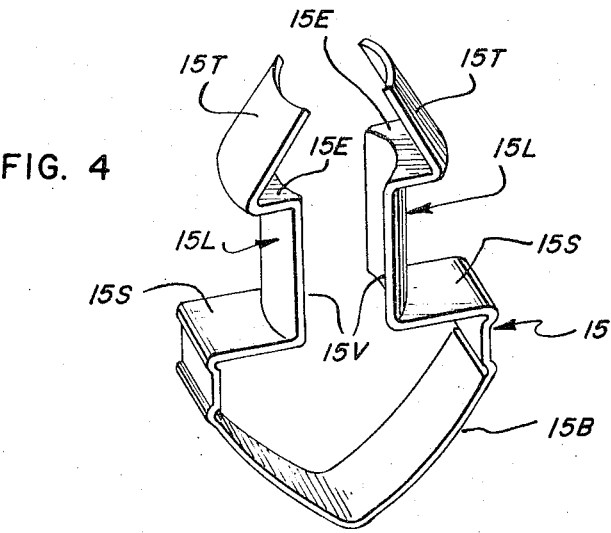
FIG. 4 is a perspective view of the clip.

In the illustrated embodiment the anchoring means 15 is in the form of a generally U-shaped spring steel clip having a laterally enlarged base portion 15B merging with complementary side by side extending leg portions 15L generally defining (in side elevation) a stepped-diameter configuration to mate with that of the vertical hole 14H in the stop block. Each clip leg portion as seen in FIGS. 3 and 4 includes an inwardly projecting leg section 15S serving as a shoulder for external contact with the bottom wall of the journal box, a vertical leg section 15V extending through the journal box bottom wall and the stepped portion of the block, an enlarged section 15E to serve as a contact shoulder for engagement with the metal washer 16 and an oblique terminal portion 15T which terminates within the confines of the stop block.

The right hand leg of the clip differs from the left hand leg in that its end portion 15T is inclined at a slightly different angle and is slightly longer to provide clearance for accommodating interference-free inward movement of the clip legs. The clip leg sections which are to be located within the cylindrical holes of the box wall and the stop block have an arcuate configuration substantially to match these holes.

The corner regions 15C where the leg portions 15V, 15E merge have a radius, as best shown in FIG. 5, to insure tight fit seating of the clip and proper compression loading of the step portion 14S of the stop block for all expected tolerance conditions of the journal box wall. For example, the standard cast journal box for a 10" journal structure has a thickness tolerance for the bottom wall ranging between ¼" and 5/16". The point of contact between the clip and the embedded washer 16 in the block is shown in full lines in FIG. 5 for the case where the journal box wall 10B is of the minimum thickness of ¼" and is shown in phantom lines for the case where the journal box wall is of maximum thickness.

To insert the anchoring clip 15 the block B is first positioned within the bottom of the box by the use of a conventional tool (not shown) that is inserted through the access opening 10A. While the hole 14H in the block is held in registry with the hole 10H in the lower wall of the box, the jaws J of a pliers are applied to the lower regions of the clip legs as shown in FIGS. 3 and 4 to enable collapse of the clip sufficiently to allow it to be moved relative to the registered holes. The clip on being expanded reacts externally against the journal box wall to apply anchoring force to the metal washer 16 and compress the step portion 14S of the stop block against the bottom journal box wall in a fashion to provide a shake proof mounting having inherent resiliency to maintain the anchorage even in the presence of the severe vibration conditions commonly encountered in railway service.

In the installed position the clearance of the upper corners 14C of the block relative to the cage of the roller bearing unit is about 5/16" for the case of the class D, 5½ by 10 inch journal block arrangement. Under impact conditions the action is such that the impact tends to raise the truck side to contact the corner regions of the block 14 against the cage 11C of the roller bearing unit 11. Where the regions of the block as disclosed herein are capable of accommodating a maximum deflection of 3/32". The nature of the polyurethane material is to cushion and absorb the energy of the shock impact so as to minimize the damage to the cage sufficiently to avoid impairment of the antifriction characteristics of the roller bearing unit. The restriction of vertical movement between the block and the cage also serves to preclude lateral contact of the cage and the journal box.

Thus, while preferred constructional features of the invention are embodied in the structure illustrated herein, it is to be understood that changes and variations may be made by those skilled in the art without departing from the spirit and scope of the appended claims.

What is claimed is:

1. In an integral journal box arrangement that is modified to accommodate a roller bearing for cooperation with a journal axle, said box having verical side walls and having a bottom wall provided with a central hole for anchoring a stop block in predetermined position against said bottom wall and having an access hole for a stop block assembly tool and said roller bearing having an external cage normally disposed in clearance relation to said stop block and to said vertical side walls, an improved stop block assembly comprising a stop block of elastomeric material, said block having a downwardly stepped vertical hole centrally thereof defining a central lower step portion of said block for registry with the central hole of said bottom wall, said block having a generally arcuate configuration in lengthwise profile to present, when at said predetermined position, corner portions in limited clearance relation to said cage, said corner portions, during impact conditions tending to produce upward and lateral relative movement between said journal box and said roller bearing, undergoing limited deformation in cushioning and restraining movement of the cage sufficiently to prevent contact between the cage and said box and to limit potential damage to said cage to thereby avoid impairment of said roller bearing, and means disposed in said stepped vertical hole and reacting externally against said bottom wall for anchoring said block into stationary position against the bottom wall of said box, said anchoring means resiliently engaging said stepped vertical hole and the bottom wall of said box such that said block and said box are maintained in engagement when said block assembly is vibrated.

2. In an arrangement as defined in claim 1, wherein the vertical hole of said block is of cylindrical stepped-diameter configuration to define an annular step portion and said improved stop block includes a metal washer located upon the step portion of said block in embedded relation in the material of said block for contact with said anchoring means to transmit said anchoring force in annularly distributed relation to said step portion.

3. In an arrangement as defined in claim 1, wherein said anchoring means comprises a generally U-shaped spring steel clip having complementary side-by-side extending leg portions normally defining a stepped diameter configuration larger than the stepped diameter configuration of said vertical hole, said clip leg portions being resiliently deflectable to accommodate pinching of said leg portions towards each other for upward insertion into block compressing relation in said vertical hole.

* * * * *